United States Patent [19]
Kazmierczak et al.

[11] Patent Number: 5,281,877
[45] Date of Patent: Jan. 25, 1994

[54] DYNAMOELECTRIC MACHINE ROTOR ENDWINDINGS WITH CORNER COOLING PASSAGES

[75] Inventors: Edmund E. Kazmierczak; Christopher A. Kaminski, both of Schenectady, N.Y.

[73] Assignee: General Electric Company, Schenectady, N.Y.

[21] Appl. No.: 976,323

[22] Filed: Nov. 13, 1992

[51] Int. Cl.$^5$ .............................. H02K 9/00
[52] U.S. Cl. ........................ 310/59; 310/61; 310/201
[58] Field of Search ........... 310/52, 54, 55, 57, 310/58, 59, 60 A, 60 R, 61, 64, 201, 260, 270, 65, 206, 207

[56] References Cited

U.S. PATENT DOCUMENTS

| | | | |
|---|---|---|---|
| 1,819,860 | 8/1931 | Belfils | 310/61 |
| 2,425,997 | 8/1947 | Criner et al. | 310/61 |
| 2,786,951 | 3/1957 | Morgan | 310/61 |
| 2,833,944 | 5/1958 | Willyoung | 310/61 |
| 3,005,119 | 10/1961 | Schmitt et al. | 310/61 |
| 3,097,317 | 7/1963 | Fochheimer | 310/54 |
| 3,225,231 | 12/1965 | Kodlacik | 310/64 |
| 3,413,499 | 11/1968 | Barton | 310/58 |
| 3,693,036 | 9/1972 | Schmitt | 310/52 |
| 3,749,952 | 7/1973 | Lambrecht et al. | 310/54 |
| 3,908,140 | 9/1975 | Fedei et al. | 310/54 |
| 4,143,290 | 3/1979 | Mizukami et al. | 310/270 |
| 4,274,021 | 6/1981 | Kamiya et al. | 310/54 |
| 4,335,324 | 6/1982 | Fujioka et al. | 310/61 |
| 4,486,676 | 12/1984 | Moore et al. | 310/52 |
| 4,543,503 | 9/1985 | Kaminski et al. | 310/59 |
| 4,546,279 | 10/1985 | Hammer et al. | 310/59 |
| 4,598,223 | 7/1986 | Glennon et al. | 310/260 |
| 4,709,177 | 11/1987 | Kaminski | 310/59 |
| 4,814,655 | 3/1989 | Kaminski | 310/260 |
| 5,055,729 | 10/1991 | Fogarts et al. | 310/214 |
| 5,081,382 | 1/1992 | Collings et al. | 310/54 |
| 5,084,642 | 1/1992 | Katsuzawa et al. | 310/54 |

Primary Examiner—Steven L. Stephan
Assistant Examiner—D. R. Haszko
Attorney, Agent, or Firm—Nixon & Vanderhye

[57] ABSTRACT

The dynamoelectric machine has endwindings 24 including a plurality of superposed conductor bars 22 and adjacent end turns 20. Rabbets 32 are formed along the undersides of the adjoining conductor bars and end turns to receive gussets 30 for reinforcing the joints therebetween. One or more of the conductor bars and end turns have cooling passages 36, 38 with ports 40, 42 opening to one side of the joint at locations short of the joint. A cooling block 48 is disposed on one side of the joint extending between the superposed conductor bars and superposed adjacent end turns and spaced from the joint to define a chamber 60 in communication through the ports with the passages for passing cooling gas therethrough in heat exchange relation to the joint assembly.

15 Claims, 3 Drawing Sheets

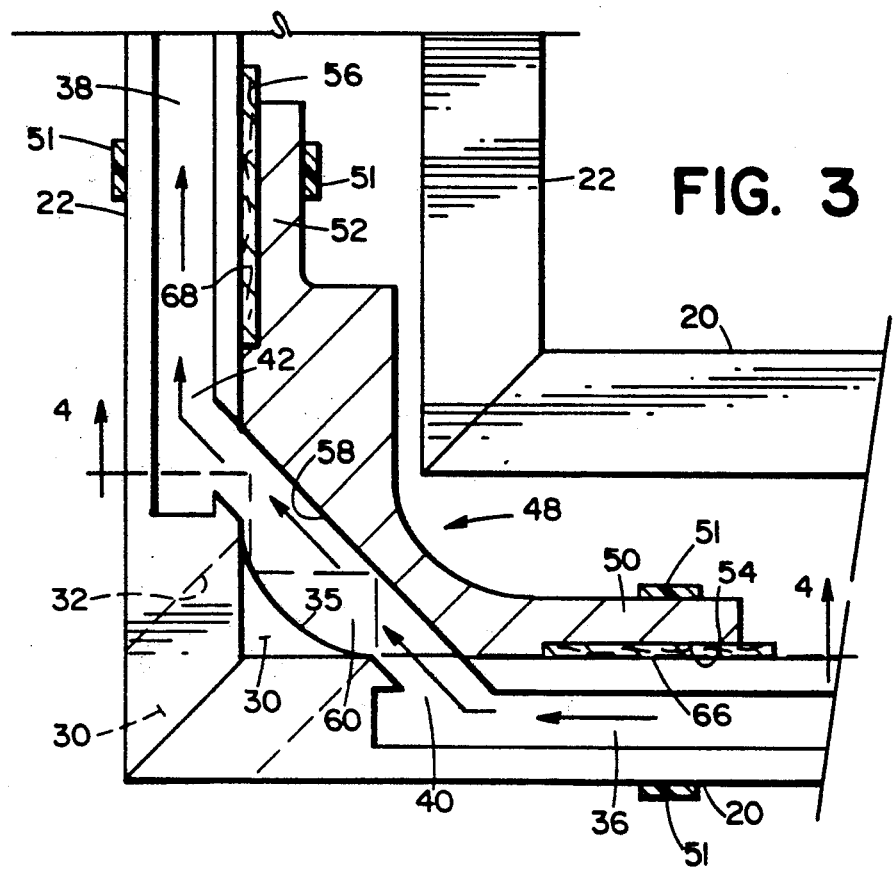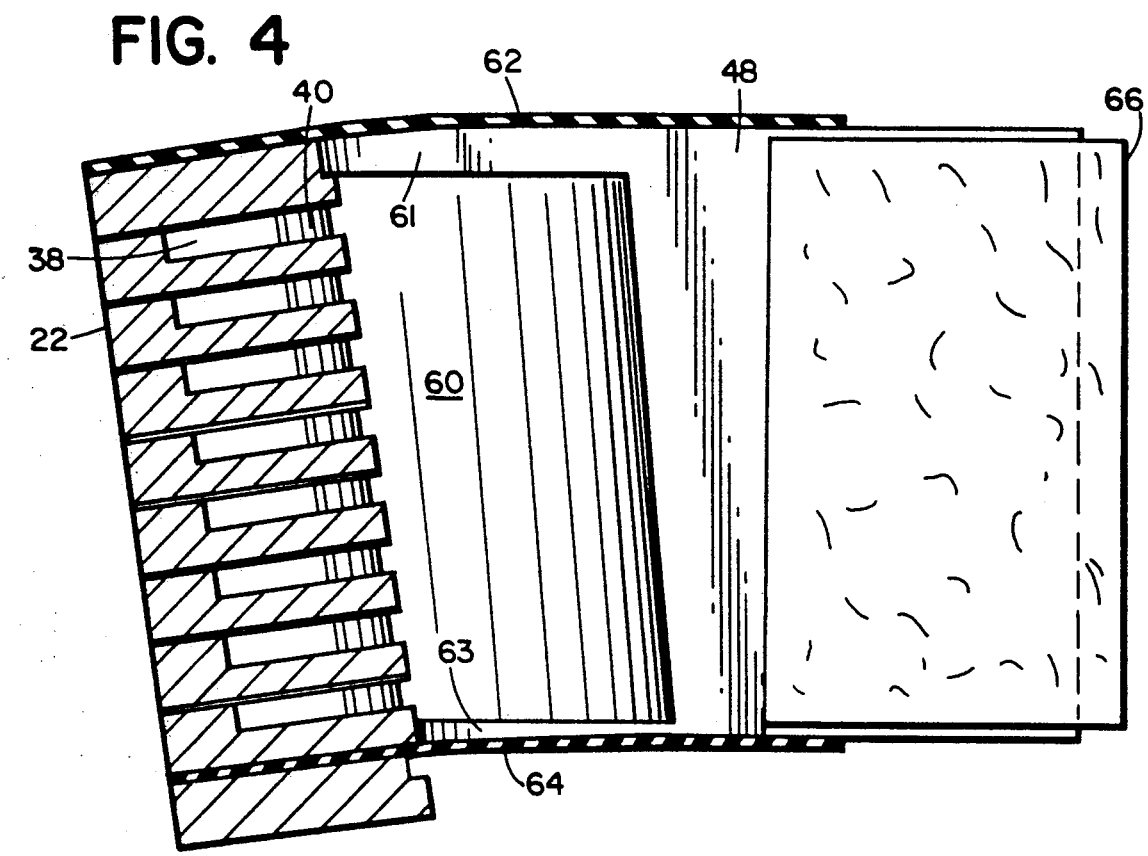

DYNAMOELECTRIC MACHINE ROTOR ENDWINDINGS WITH CORNER COOLING PASSAGES

TECHNICAL FIELD

The present invention relates to the endwindings of a rotor of a dynamoelectric machine and particularly relates to the formation of cooling passages about the corners of the rotor endwindings.

BACKGROUND

A rotor for a dynamoelectric machine typically comprises a cylindrical forging of magnetic metal having a plurality of longitudinal slots opening through the outer surface of the rotor at circumferentially spaced positions thereabout. Conductor bars are disposed in the slots for carrying current. The ends of the conductor bars are suitably connected with conductive end turns to form the required current pattern. Because the conductor bars and end turns give rise to resistive heating, certain dynamoelectric machines require additional cooling of the rotor endwindings. This is typically provided by grooved ventilation passages within the end turns and conductor slot bars through which cooling gas may flow.

The various ventilation schemes which make use of cooling grooves in the endwindings, however, introduce manufacturing complexities. One such complexity is that it is difficult to form or fabricate a well shaped, mechanically sound coil corner with a cooling groove passing through it. It is also somewhat difficult to maintain the shape of the cooling groove to proper tolerances when forming it around the coil corner. In addition, many of the present grooved endwinding ventilation schemes require complex baffling in the endwinding region to set up high and low pressure regions to properly channel the cooling gas into and out of the cooling grooves. Some of the baffling schemes require additional shaft machining to create mechanical support for the baffles.

Several approaches have been used to duct cooling gas from grooves in the circumferentially oriented end turns to grooves in the conductor slot bars. The simplest approach was to use round corner turns and let the duct follow the curvature of the corner. This approach, however, does not apply to designs with square corner windings.

For designs with square corner coils, twin layer turns are used to form ducts by laying together two grooved pieces of copper with the grooves facing each other. At the coil corner, a gusset is brazed in place as a means of joining the circumferential end turns to the conductor bars. At the coil corner, the gusset is also grooved so as to allow cooling gas to flow from the end turn to the conductor bar.

A third approach involves feeding the gas into each turn on both sides of the coil corner and ducting it away from the coil corner. This requires additional baffling in the pole center to create a low pressure region into which the gas in the end turns can flow which creates an undesirable amount of complexity.

A fourth approach, as described in Kaminski et. al., U.S. Pat. No. 4,543,503, makes use of single layer conductor bars and twin layer end turns. Gas is channeled away from the coil corners much like in the third approach described above.

A fifth approach, described in U.S. Pat. No. 4,814,655, requires the gas to flow through the reverse side of a single layer gusset. This involves an undesirable degree of pressure loss.

A sixth approach does not rely on internal ducts at all but rather channels all the gas externally via sinuous passages in the coil-to-coil blocking. This has the disadvantage of giving up the benefits of free convection cooling. It also creates a rigid endwinding structure which is not conducive to thermal expansion of the rotor winding.

DISCLOSURE OF INVENTION

In accordance with the present invention, complexities of manufacture in forming cooling passages at the corner of the endwindings are minimized or eliminated. To accomplish this, the endwindings comprise stacks of conductor slot bars and end turns wherein each conductor bar registers with an end turn forming a junction, in this case, a square corner junction which is reinforced using a gusset. Thus, an endwinding set may be defined as a conductor bar joined with a registering end turn by a gusset, it being appreciated that a plurality of stacked winding sets are provided, separated by electrical insulating material. To form corner cooling passages, one or more of the endwinding sets is provided with cooling passages for passing cooling gas. These passages extend toward the junction and terminate short of the junction in ports opening through the conductor bar and end turn on one side of the joint.

The ends of the conductor bar and end turn of each winding set are rabbeted to receive a gusset which projects away from the juncture and toward the one joint side. The gusset forms a radius projecting toward the one joint side. A corner block extends along the one side of the joint for at least part of the height or the full height of the stacked winding sets. The corner block thus has angularly related legs which bear against the inside surfaces of the stacked conductor bars and the stacked end turns, respectively. The block has top and bottom caps which extend from the top and bottom surfaces of the block to overlie or underlie, depending upon the position of the rotor, the upper and lower endwinding sets for sealing against gas leaking. The surface of the corner block in opposition to the joint between the stacked conductor bars and end turns is recessed away from the corner of the endwindings to form a cooling channel or chamber extending at least part of the height or the full height of the stacked winding sets. By recessing the corner block, there is defined a pair of opposed corner block flanges at opposite ends of the chamber. Alternatively, the ends of the chamber may be defined by the top and bottom caps. Thus, the cooling block may have a wall surface spaced from the radii of the gussets to define with the opposite end flanges and overlying sealing caps or the end caps per se an enclosed chamber in open communication through the ports of the conductor bars and end turns with the respective cooling passages therein. Conformable seals are interposed between the legs of the cooling block and the stacked conductor bars and stacked end turns, respectively, to seal against the escape of cooling gas.

In use, it will be appreciated that the cooling passages in the conductor bars and end turns lie in communication through the ports, with the closed chamber defined by the block, the stacked endwindings and the end flanges or caps. In this manner, the cooling gas, for example, from one conductor bar, may pass through the port into the chamber and exit the chamber through a port of an end turn at a different elevation. Further, the gussets have radii which project into the cooling chamber to form cooling fins for improving the heat transfer efficiency. The cooling block is, of course, formed of a non-metallic material and thus, in part, defines the transition passage for flowing cooling gas between the cooling passages of the end turns and conductor bars.

In a preferred embodiment according to the present invention, there is provided a dynamoelectric machine having endwindings including a plurality of stacked conductor bars and stacked end turns having ends respectively registering with one another and forming junctions, the plurality of stacked conductor bars and the plurality of stacked end turns being angularly related each to the other such that the junctions form a joint assembly with side surfaces of the conductor bars and the end turns lying on one side of the joint assembly, apparatus for cooling the joint assembly formed by the junctions of the conductor bars and the end turns comprising means for securing the ends of the registering conductor bars and end turns one to the other, at least one of the plurality of stacked conductor bars and one of the plurality of stacked end turns each having a passage for passing cooling gas therealong and a port in communication with the cooling passage for passing cooling gas therethrough, the port in one conductor bar opening through the side surface thereof on one side of the joint assembly and short of the junction of the one conductor bar and its registering end turn, the port in the end turn opening through the side surface thereof on one side of the joint assembly and short of the junction of one end turn and its registering conductor bar. A block is provided on one side of the joint having lateral portions engageable with the side surfaces of the stacked conductor bars and the stacked end turns, respectively, and having a surface in spaced opposition to the junctions to define with the side surfaces a chamber forming a cooling gas channel extending between and in communication with the ports along one side of the joint assembly whereby cooling gas may pass through the passages, the ports and the chamber.

In a further preferred embodiment according to the present invention, there is provided a dynamoelectric machine comprising endwindings including a plurality of superposed conductor bars and a plurality of superposed adjacent end turns with an end portion of each conductor bar in registry with an end portion of an adjacent end turn forming a junction, with means for securing the registering end portions of the conductor bars and the end turns one to the other, with the superposed conductor bars and superposed end turns defining a joint assembly. One of the conductor bars and one of the end turns each has a passage for transmitting cooling gas therealong, a port in the conductor bar in communication with the passage thereof for passing cooling gas therethrough, a port in the one end turn in communication with the passage thereof for passing cooling gas therethrough, the ports being located in the end portions of the one conductor bar and the one end turn, respectively, adjacent the joint assembly on one side of said joint. Means extend between the superposed conductor bars and the superposed adjacent end turns on the one side of the joint and spaced from the junctions defining with the end portions a chamber in communication through the ports with the passages for passing cooling gas therethrough in heat exchange relation to the joint assembly.

Accordingly, it is a primary object of the present invention to provide in a dynamoelectric machine, endwindings having cooling passages which minimize or eliminate complex manufacturing procedures and which cooling passages bypass the corner joint and gussets used to reinforce the junctures between the conductor bar and end turn of each winding set while simultaneously affording cooling of the coil corner and avoiding substantial pressure drop of the cooling gas.

These and further objects and advantages of the present invention will become more apparent upon reference to the following specification, appended claims and drawings.

BRIEF DESCRIPTION OF DRAWINGS

FIG. 3 is a top plan view of the miter joints between stacked end turns and conductor bars with gussets and a cooling block according to the present invention;

FIG. 4 is an enlarged cross-sectional view thereof taken generally about on line 4—4 in FIG. 3;

BEST MODE FOR CARRYING OUT THE INVENTION

Reference will now be made in detail to a present preferred embodiment of the invention, an example of which is illustrated in the accompanying drawings.

Figure 1:
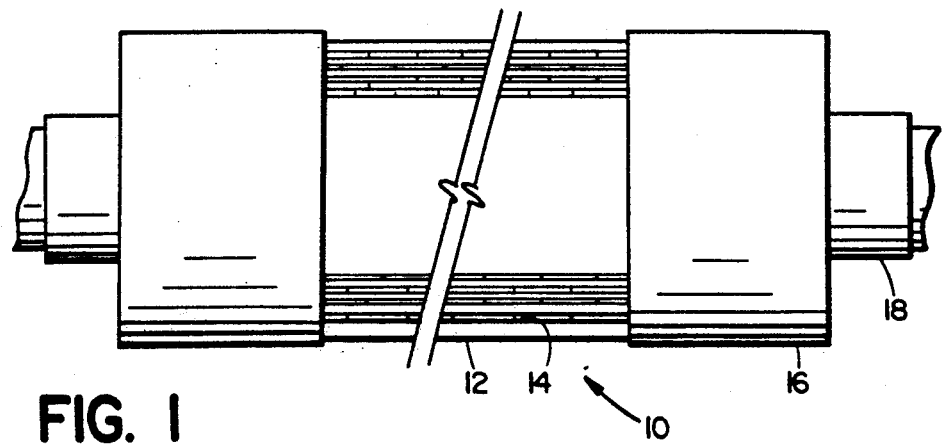
FIG. 1 is a fragmentary side elevational view of a rotor of a dynamoelectric machine incorporating endwindings with corner cooling passages according to the present invention.

Referring to FIG. 1, there is illustrated a rotor, generally designated 10, for a dynamoelectric machine which also includes a stator, not shown, surrounding the rotor. Rotor 10 includes a generally cylindrical rotor forging body 12 having a plurality of circumferentially spaced, longitudinally extending slots 14 containing stacked conductor bars. The conductor bars are interconnected at opposite ends with end turns to form endwindings housed within end caps 16. Rotor shafts 18 project from the opposite ends of the rotor and these may be integrally formed or otherwise connected with the rotor body 12. The operation of the dynamoelectric machine is well known and need not be described further.

Figure 2:
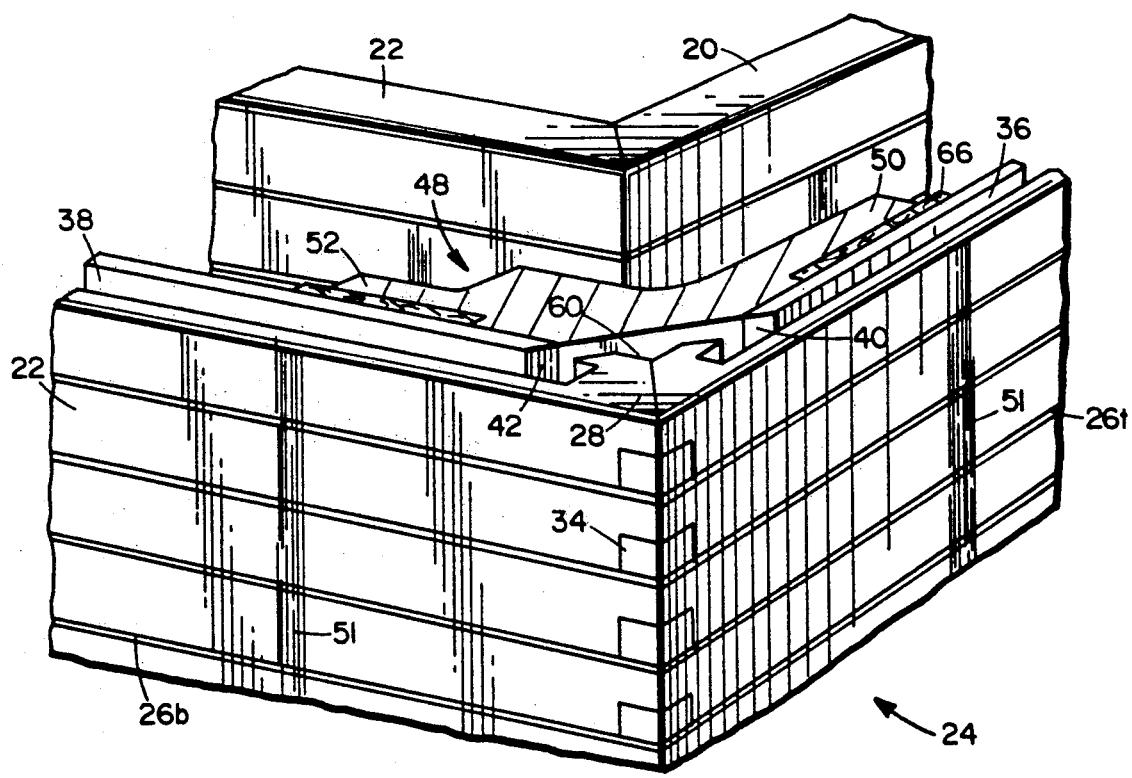
FIG. 2 is an enlarged fragmentary perspective view illustrating the miter joints between stacked end turns and conductor bars with the cooling block disposed on one side of the joint according to the present invention.

Referring to FIG. 2, there is illustrated superposed stacks of joined end turns 20 and conductor bars 22 forming stacked endwindings, generally designated 24. The stacked conductor bars 22 are maintained in the slots 14 of the rotor body 12, typically by wedges, not shown, and are formed of conductive material, such as copper. The individual conductor bars are separated by electrical insulation 26b. The end turns 20, as well known, interconnect the ends of the conductor bars 22 extending from the ends of the slots in the rotor body. The end turns 20 extend across each end of the rotor body and are likewise separated one from the other by electrical insulation 26t. The individual conductor bars 22 are connected with the end turns 20 at joints including a mitered junction 28 between each corresponding (aligned) conductor bar and end turn.

More particularly, and referring to FIGS. 2 and 3, the abutting surfaces of each conductor bar 22 and corresponding end turn 20 are reinforced by a gusset 30 which overlaps the ends of the registering conductor bar and end turn, these elements forming an endwinding set. In a preferred form, the ends of the conductor bars 22 and end turns 20 are partially cut away, for example, along their undersides as illustrated in FIG. 2, to form rabbets, the outlines of which are illustrated in FIG. 3 by the dashed lines 32. Gusset 30 includes a gusset portion 34 which is received within rabbets 32 and secured thereto, for example, by brazing, to reinforce the connection between a registering or aligned conductor bar and end turn. It will be appreciated that the gusset has a depth or a thickness less than the depth or thickness of the conductor bar and end turn which is reinforced by the gusset. Particularly, the gusset has a thickness corresponding to the depth of the rabbets formed in the conductor bar and end turn. The gusset portion 34 which is received in the rabbets extends to one side of the joint and terminates in a radius 35.

It will be appreciated that, in certain installations, cooling passages are provided within one or more of the winding sets at each corner. For example, cooling passages 36 may be formed in the end turns 20 and cooling passages 38 may be formed in the conductor bars 22. These cooling passages essentially comprise grooves formed through the top or bottom surfaces of the conductor bar and end turn for conducting cooling gas. It will be appreciated that the cooling passages need not be in each conductor bar and end turn but can be alternated or formed in selected ones of the conductor bars and end turns, as desired, depending upon cooling needs.

In accordance with the present invention, the cooling passages 36 and 38, where provided, have ports 40 and 42, respectively, which open toward one side of the joint between the conductor bar and end turn, preferably the side of the joint formed by the conductor bar and end turn forming an included angle. Ports 40 and 42 extend through the walls of the conductor bar and end turns at locations short of the mitered joint between the ends thereof and short of gusset 30 used to reinforce the mitered ends.

In accordance with the present invention, the corner endwindings are configured to afford cooling passages on the one side of the joint for communicating cooling gas from one port to the other port in a manner which facilitates cooling the corner joint, yet affords a simplicity of manufacture and avoidance of substantial pressure drop across the endwindings. To accomplish this a member, for example, a cooling block, generally designated 48, is disposed on one side of the joint, particularly within the included angle of the joint formed by the stacked conductor bars and end turns. The block extends at least part of the height or substantially the full height of the stacked endwindings and has leg portions 50 and 52 angled relative to one another similarly as the stacked conductor bars and stacked end turns are angled relative to one another. Each leg portion 50 and 52 along its distal end and extending the full height of the block 48 has a recess 54 and 56, respectively, for containing a conformable seal. For example, seals 66 and 68 may be formed of a felt material which will conform to the inner surfaces of the stacked conductor bars and stacked end turns.

Figure 6:
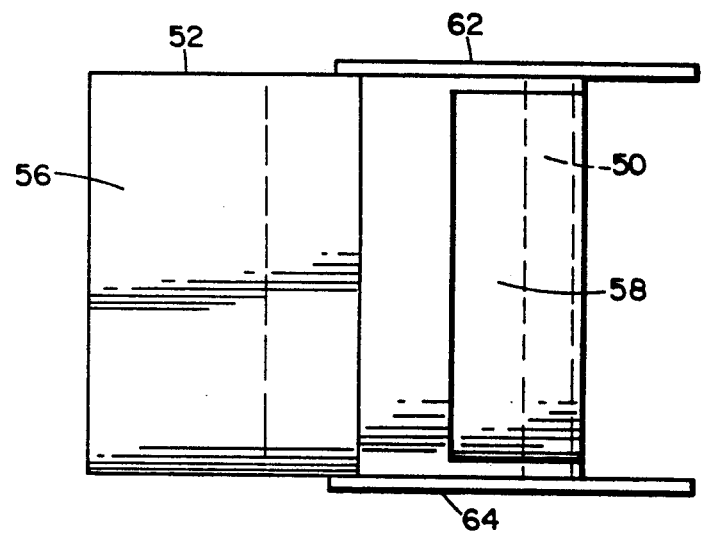
FIG. 6 is an elevational view of the cooling block looking from left to right in FIG. 5.
Figure 7:
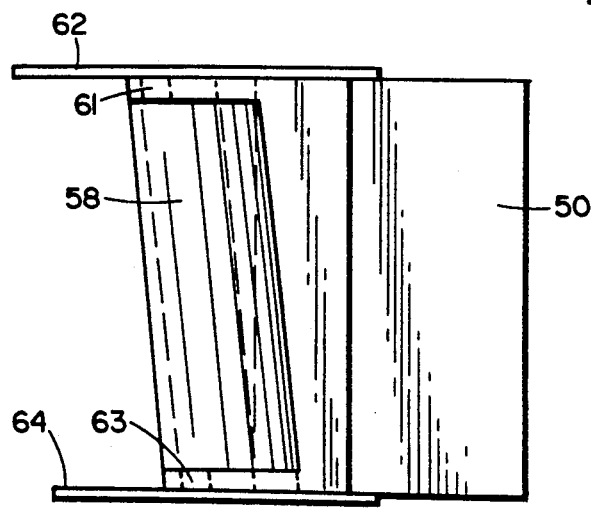
FIG. 7 is a side elevational view of the cooling block of FIG. 3 looking from right to left in FIG. 6.

As best illustrated in FIGS. 6 and 7, the surface 58 of block 48, which surface is in opposition to the joint formed by the stacked conductor bars and end turns is angled between legs 50 and 52 to define a cooling chamber 60 (FIGS. 2, 3 and 4) between it and the inside faces of the stacked conductor bars and stacked end turns. To ensure that the chamber 60 is enclosed at the opposite ends, the block 48 is provided with top and bottom end flanges 61 and 63 and end caps 62 and 64, respectively, the flanges and caps overlying the top and bottom endwinding sets. It also may be provided with only end caps and without flanges. The end caps provide seals for preventing gas leakage. Consequently, the cooling chamber 60 is defined by the inside surfaces of the stacked conductor bars, the stacked end turns, the angled surface 58 of the cooling block 48 and the end flanges 61, 63 and/or caps 62, 64.

Figure 5:
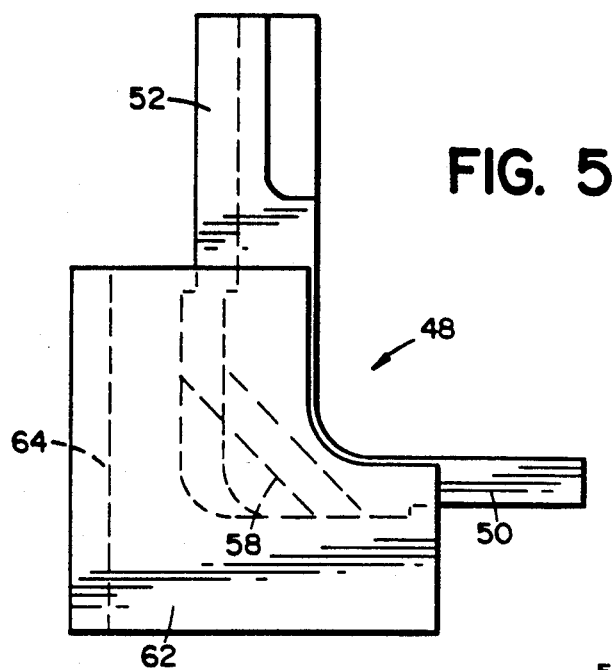
FIG. 5 is a top plan view of a cooling block according to the present invention.

As illustrated in FIGS. 5 and 7, the face of the cooling block in direct opposition to the stacked conductor bars is angled from top to bottom in order to accommodate the radial location of the stacked conductor bars. As a consequence, the end surface 58 of the block 48 is likewise angled downwardly, i.e., radially and axially inwardly relative to the rotor.

The block 48 is provided with conformable seals 66 and 68 in the recessed portions 54 and 56, respectively, of the legs 50 and 52. The conformable seals are formed of a non-metallic material, for example, felt, whereby the seals may conform to the inner surfaces of the stacked conductor bars and stacked end turns. The block 48 may be suitably secured to the conductor bars and end turns by non-conducting ties 51. The ties 51 may also compress the conformable seal to conform to the stack of end turns and conductor bars to fill voids and prevent leakage.

It will be appreciated that with this arrangement, the cooling gas may pass from a cooling passage, for example, in an end strap 20, through port 40 into the enclosed chamber 60 and the entrance port 42 for the cooling passage 38 in a conductor bar 22. The ports are completely open to the chamber 60. It will be appreciated that because of the radiussed edge of the gussets, the gussets form fins which enhance the heat transfer between the cooling gas and the corner of the endwindings.

The end caps 62 and 64 may be formed of a flexible, non-metallic material. The end caps are suitably secured to the block and endwinding sets to form seals preventing leakage of cooling gas.

While the bypass block is illustrated on the inside of the coil corner, the block may also be shaped and used along the outside of the corner. Additionally, blocks on both the inside and outside corners may be used to form a pair of chambers in communication with the cooling passages on each of the opposite sides of the joint. The block structure, while preferably rigid, may be flexible, provided the block is capable of sealing the cooling chamber around the coil corner.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a dynamoelectric machine having endwindings including a plurality of stacked conductor bars and stacked end turns having ends respectively registering with one another and forming junctions, said plurality of stacked conductor bars and said plurality of stacked end turns being angularly related each to the other such that said junctions form a joint assembly with side surfaces of said conductor bars and said end turns lying on one side of said joint assembly, apparatus for cooling the joint assembly formed by said junctions of said conductor bars and said end turns, comprising:
   means for securing the ends of the registering conductor bars and end turns one to the other;
   at least one of said plurality of stacked conductor bars and one of said plurality of stacked end turns each having a passage for passing cooling gas therealong and a port in communication with the cooling passage for passing cooling gas therethrough, said port in said one conductor bar opening through said side surface thereof on said one side of said joint assembly and short of the junction of said one conductor bar and its registering end turn, said port in said end turn opening through said side surface thereof on said one side of said joint assembly and short of the junction of said one end turn and its registering conductor bar;
   a block on said one side of said joint assembly having lateral portions engageable with said side surfaces of said stacked conductor bars and said stacked end turns, respectively, and having a surface in spaced opposition to said junctions to define with said side surfaces a chamber forming a cooling gas channel extending between and in communication with said ports along said one side of said joint assembly whereby cooling gas may pass through said passages, said ports and said chamber.

2. A dynamoelectric machine according to claim 1 wherein said one conductor bar and said one end turn lie in registry one with the other.

3. A dynamoelectric machine according to claim 1 wherein said block has a pair of end flanges substantially closing said chamber.

4. A dynamoelectric machine according to claim 1 wherein said block has a pair of end caps overlying the opposite ends of said stacked conductor bars and said stacked end turns substantially sealing said chamber at its opposite ends.

5. A dynamoelectric machine according to claim 1 including means for conformably sealing said lateral portions of said block and said side surfaces one to the other, respectively.

6. A dynamoelectric machine according to claim 4 wherein said sealing means includes a flexible, electrically non-conductive material.

7. A dynamoelectric machine according to claim 1 wherein said block is formed of a non-metallic material.

8. A dynamoelectric machine according to claim 1 wherein said stacked conductor bars and said stacked end turns form an included angle of less than 180° defining said one side of said joint assembly.

9. A dynamoelectric machine according to claim 1 including means for conformably sealing said lateral portions of said block and said side surfaces one to the other, respectively and ties securing said lateral portions of said block to said stacked conductor bars and said stacked end turns.

10. A dynamoelectric machine comprising:
    endwindings including a plurality of superposed conductor bars and a plurality of superposed adjacent end turns with an end portion of each conductor bar in registry with an end portion of an adjacent end turn forming a junction;
    means for securing the registering end portions of said conductor bars and said end turns one to the other, with the superposed conductor bars and superposed end turns defining a joint assembly;
    one of said conductor bars and one of said end turns each having a passage for transmitting gas therealong, a port in said conductor bar in communication with the passage thereof for passing cooling gas therethrough, a port in said one end turn in communication with the passage thereof for passing cooling gas therethrough, said ports being located in said end portions of said one conductor bar and said one end turn, respectively, adjacent said joint assembly on one side thereof; and
    a member extending between said superposed conductor bars and said superposed adjacent end turns on said one side of said joint assembly and spaced from said junctions defining with said end portions a chamber in communication through said ports with said passages for passing cooling gas therethrough in heat exchange relation to said joint assembly.

11. A dynamoelectric machine according to claim 10 wherein said one conductor bar and said one end turn lie in registry one with the other.

12. A dynamoelectric machine according to claim 10 wherein said member extends substantially the full height of said superposed conductor bars and said superposed end turns.

13. A dynamoelectric machine according to claim 12 wherein said member is formed of non-metallic material.

14. A dynamoelectric machine according to claim 10 wherein said superposed conductor bars and said superposed end turns form an included angle of less than 180° defining said ne side of said joint assembly.

15. A dynamoelectric machine according to claim 10 including means for sealing said member to said superposed conductor bars and said superposed end turns.

* * * * *